United States Patent
Flothmann et al.

(10) Patent No.: US 9,919,634 B2
(45) Date of Patent: Mar. 20, 2018

(54) STORAGE COMPARTMENT HAVING A HOLDER FOR A BEVERAGE CONTAINER

(71) Applicant: Fischer automotive systems GmbH & Co. KG, Horb a.N. (DE)

(72) Inventors: Jörg Flothmann, Bondorf (DE); Gunter Leopold, Baiersbronn (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 0 days.

(21) Appl. No.: 15/417,367

(22) Filed: Jan. 27, 2017

(65) Prior Publication Data
US 2017/0217352 A1 Aug. 3, 2017

(30) Foreign Application Priority Data

Feb. 1, 2016 (DE) ........................ 10 2016 101 689

(51) Int. Cl.
*B60N 3/10* (2006.01)
*B60R 7/04* (2006.01)

(52) U.S. Cl.
CPC ............ *B60N 3/108* (2013.01); *B60N 3/101* (2013.01); *B60R 7/04* (2013.01)

(58) Field of Classification Search
CPC ........ B60N 3/108; B60N 3/105; B60N 3/101; B60R 7/04; B65D 25/06; B65D 25/04
USPC ........ 220/544, 543, 529, 500, 737; 224/483, 224/539; 248/311.2
See application file for complete search history.

(56) References Cited

U.S. PATENT DOCUMENTS

| | | | | |
|---|---|---|---|---|
| 5,671,877 A | * | 9/1997 | Yabuya | B60N 3/102 224/282 |
| 5,791,618 A | * | 8/1998 | Lancaster | B60N 3/103 224/926 |
| 6,230,948 B1 | * | 5/2001 | Steiger | B60N 3/102 224/539 |
| 6,705,580 B1 | * | 3/2004 | Bain | B60N 3/106 248/311.2 |
| 2005/0001127 A1 | | 1/2005 | Schaal | |
| 2008/0099505 A1 | * | 5/2008 | Lawlor | B60N 3/106 222/93 |

FOREIGN PATENT DOCUMENTS

| | | |
|---|---|---|
| CN | 102 452 346 A | 5/2012 |
| DE | 10 2008 047 478 A1 | 4/2010 |
| DE | 103 29 959 B4 | 8/2015 |
| EP | 1 277 613 B1 | 12/2006 |

OTHER PUBLICATIONS

German Search Report dated Nov. 16, 2016 for German Application No. 10 2016 101 691.8.

* cited by examiner

*Primary Examiner* — Robert J Hicks
(74) *Attorney, Agent, or Firm* — Renner Otto Boisselle & Sklar, LLP

(57) ABSTRACT

The invention relates to a storage compartment for a center console of a motor vehicle, having a partial cylinder shell-shaped compartment divider, which is movable on a circular path, in order to separate a storage region from the storage compartment in order to store a beverage container. For the purpose of supporting a stored beverage container in a tilt-free manner, the invention provides a spring-loaded support element on the compartment divider, the movement of which is synchronized with fixed support elements on a circumference of the storage region.

6 Claims, 1 Drawing Sheet

STORAGE COMPARTMENT HAVING A HOLDER FOR A BEVERAGE CONTAINER

CROSS-REFERENCE TO RELATED APPLICATION

The present application claims priority under 35 USC § 119 to German Patent Application No. 10 2016 101 689.6 filed on Feb. 1, 2016, the entire disclosure of which is incorporated herein by reference.

TECHNICAL FIELD

The invention relates to a storage compartment having a holder for a beverage container having the features described herein.

DESCRIPTION OF THE RELATED ART

Such a storage compartment is known from European patent EP 1 277 613 B1. The known storage compartment has the shape of a container, which is open at the top and is oval as viewed from above, and is provided for installation into, for example, a center console of a motor vehicle. "Top" refers to an intended installation and usage position of the storage compartment. In this case, "oval" is intended to mean a shape having two parallel straight lines, which are connected at the ends thereof by semicircles. At center points of the semicircles of the known storage compartment, circular disk-shaped rotating plates are disposed, in a rotatably supported manner, on a base of the storage compartment and have a partial cylinder shell-shaped circumferential wall, which extends in a circumferential direction through, for example, approximately 90°. The partial cylinder shell-shaped circumferential walls form compartment dividers, which can be moved, by rotating the rotating plates, inward or outward, against a semicylindrical shell-shaped side wall of the storage compartment, into a home position and, by rotation, into a dividing position in which the compartment dividers protrude into the storage compartment and separate cylindrical storage regions in the storage compartment. The storage regions are used for storing beverage containers such as cups, beverage cans, mugs, or drinking bottles. In the home position, in which the compartment dividers are located against the semicylindrical shell-shaped side walls of the storage compartment, the entire storage compartment is available for storing, for example, small articles such as pens, cigarette lighters, mobile phones, etc. In the region of each of the semicylindrical shell-shaped side walls, the known storage compartment has a rectangular window extending in the circumferential direction, through which a support element swivels, under spring force, into the particular storage region of the storage compartment, when the compartment divider is moved into the dividing position. In the case of the known storage compartment, the support elements are cylindrical shell-shaped strips, which are swivelable, at one of the ends thereof, about vertical axes. The window is an opening in the side wall of the storage compartment. When the compartment divider is moved out of the dividing position and into the home position, the compartment divider glides inwardly along the particular support element and presses the support element outward, against the spring force, and therefore the support element does not protrude into the storage compartment when the compartment divider is located in the home position. The support element supports a beverage container, which has been placed into a storage region of the storage compartment, laterally above the base of the storage compartment, and is used for holding the beverage container in the storage region of the storage compartment in a tilt-proof manner.

SUMMARY

The object of the invention is to improve a lateral support of a beverage container, which has been placed in a holder of a storage compartment of the above-described type.

This object is achieved by the features described herein. The storage compartment according to the invention has a movably guided compartment divider, by means of which a storage region for a beverage container can be separated off in the storage compartment. As a result, the storage compartment can be used as a holder for a beverage container. The compartment divider can be movably guided into the storage compartment in a straight manner or on a curve. The compartment divider can also be movably guided on a circular path, which is possible not only by way of a sliding guide, but also, for example, by way of a rotatable support in a center of the circular path. In a dividing position, the compartment divider, which has been moved into the storage compartment, separates a storage region, for example, in a corner or at one end of the storage compartment, from the remainder of the storage compartment. In a home position, in which this has been moved out of the storage compartment, the entire storage compartment is available for accommodating objects.

For the purpose of adapting to beverage containers having different diameters or, in general, different cross-sectional areas, the storage compartment according to the invention comprises two support elements for a lateral support of a beverage container, which has been placed into the storage region for the beverage container, the support elements being movable into and out of the storage region. The support elements can be, for example, swivelably supported or displaceably guided. When the compartment divider of the storage compartment according to the invention is moved out of the dividing position and into the home position, the compartment divider forces one of the two support elements out of the storage compartment.

For the purpose of moving the other support element, the storage compartment according to the invention has a synchronization mechanism, which brings about a joint movement of the support elements. As a result, the support elements move jointly into and out of the storage region. If a support element is forced out of the storage region during the movement of the compartment divider out of the dividing position and into the home position, the other support element also moves out of the storage region, due to the synchronization mechanism. The invention can also be designed to have more than two support elements, wherein at least one support element is forced out of the storage region when the compartment divider is moved out of the dividing position and into the home position and, due to the synchronization mechanism, the support element or the other support elements are also moved out of the storage region.

Furthermore, at least one support element is located on the compartment divider and at least one support element is fixedly disposed on the storage compartment. The support element disposed on the compartment divider moves along with the compartment divider, whereby it is possible to move this support element into the storage compartment. The support element can be disposed in such a way that the support element is located opposite a corner or one end of the storage compartment, in the dividing position of the compartment divider, and a beverage container placed into the storage region rests laterally against the corner or the end of the storage compartment. A lateral support of a beverage container, which has been placed into the storage region of the storage compartment, is therefore improved.

The compartment divider can have an extension in the direction of motion thereof, which is to say, the compartment divider can be rod-shaped or plate-shaped, for example. A bollard-shaped compartment divider, for example, is also possible, which is located in the storage compartment at a distance from a corner or from one end of the storage compartment in the dividing position and therefore separates the storage region from the remainder of the storage compartment at a point.

It is possible to design the storage compartment according to the invention to have a plurality, for example, two compartment dividers, by means of which a plurality, for example, two storage regions for containers can be separated from the storage compartment. Associated with each of the compartment dividers or the storage regions are two or more support elements for the lateral support of stored beverage containers, as described above.

In order to move a support element out of the storage region, it is provided according to one embodiment of the invention that a window is provided in the compartment divider, in which the support element is located with the compartment divider in the dividing position, and therefore the support element can be moved through the window of the compartment divider, into the storage region, with the compartment divider in the dividing position. For example, a spring element forces the support element into the storage region. If the compartment divider is moved out of the dividing position, out of the storage compartment, and into the home position, the window of the compartment divider moves relative to the support element, wherein one edge of the window of the compartment divider forces the support element out of the storage region. For this purpose, in one embodiment of the invention, one edge of the window extends at a slant, which is to say, at an angle with respect to a direction of motion of the compartment divider, and the support element has a slanted surface, along which the slanted edge of the window of the compartment divider glides when the compartment divider is moved out of the dividing position and into the home position. In this case, the edge of the compartment divider, which extends at a slant with respect to the direction of motion, forces the support element, on the slanted surface thereof, out of the storage region for the beverage container of the storage compartment. The edge of the window of the compartment divider, which extends at a slant with respect to the direction of motion of the compartment divider, forms a type of control curve, which forces the support element, on the slanted surface thereof, out of the storage region, when the compartment divider is moved out of the dividing position and into the home position.

In order to move the support element or a plurality of support elements out of the storage region during the movement of the compartment divider out of the dividing position and into the home position, another embodiment of the invention provides a first curve control, wherein, for example, a ramp or a glide path can form a control curve for the curve control. The first curve control forces the support element out of the storage region for the beverage container of the storage compartment when the compartment divider is moved out of the dividing position and into the home position. The support element can be fixedly disposed or disposed on the compartment divider and can be movable therewith. In the case of a fixed support element, a control curve of the first curve control is disposed, for example, on the compartment divider or is driven by the compartment divider. In the case of a support element that is disposed on the compartment divider and moves along with the compartment divider, the control curve for the first curve control is, for example, fixed in position, and the movement of the support element along the control curve forces the support element out of the storage region.

For the purpose of synchronization, or as synchronization of the support elements, one embodiment of the invention provides a second curve control having a second control curve, which extends in a direction of motion of the support element disposed on the compartment divider during a movement of the compartment divider, and which is vertically movable. If the compartment divider, for example, and, therewith, the support element, move on a circular path, the second control curve is, for example, a circular, circumferential groove or rib, for example, on a periphery of a circular disk, which is vertically movable. A control element, for example, a control pin of the support element, is movable along the second control curve, and therefore a movement of the support element into the storage region for the beverage container of the storage compartment and out of the storage region vertically moves the second control curve for the second curve control. The vertical movement of the second control curve moves the other support element(s), which is/are therefore moved synchronously with the support element(s) that raise(s) or lower(s) the second control curve. As a result, all the support elements move synchronously, which is to say, all the support elements jointly move out of the storage region.

BRIEF DESCRIPTION OF THE DRAWINGS

The invention is described in greater detail in the following with reference to an exemplary embodiment shown in the drawings.

Figure 1:
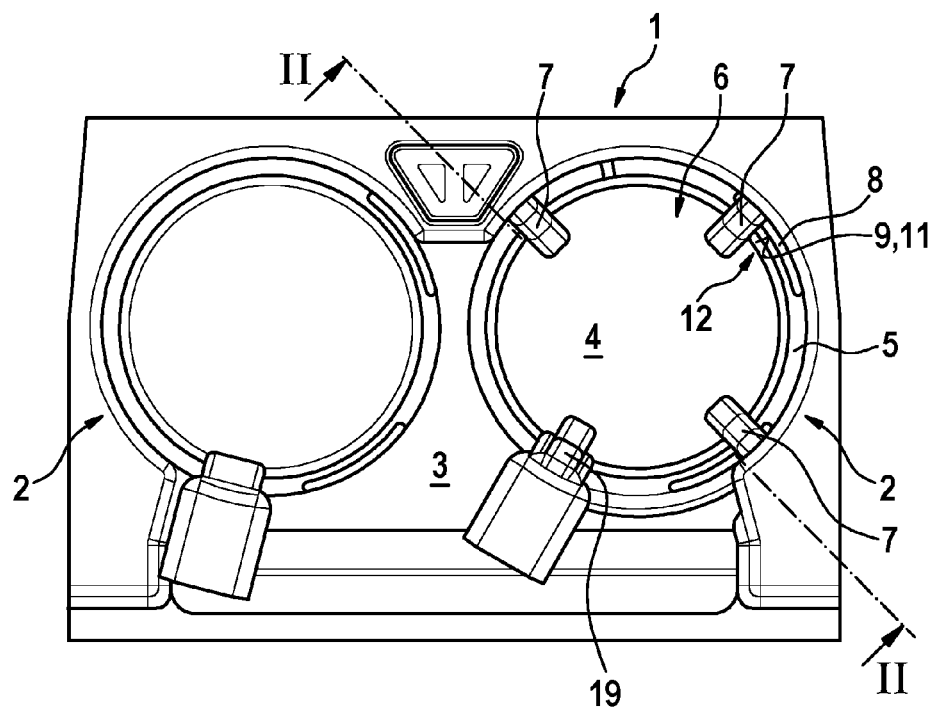
FIG. 1 shows a storage compartment having two holders for beverage containers according to the invention, as viewed from above.

The drawings are simplified and schematicized depictions for ensuring an understanding of the invention and for describing the invention.

DETAILED DESCRIPTION OF THE INVENTION

The storage compartment 1 depicted in the drawings is intended for installation, for example, into a non-illustrated center console of a motor vehicle. The storage compartment is in the form of a container that is open at the top in an installation position and has two semicylindrical bulges, which are open toward the storage compartment 1. A circular disk-shaped rotating plate 4 is rotatably supported on a base 3 of the storage compartment 1, concentrically, in each bulge 2, and comprises a partial cylinder shell-shaped circumferential wall, which is referred to here as a compartment divider 5. Rotating the rotating plate 4 causes the compartment divider 5 to move on a circular path. The compartment divider can be moved out of a home position, which is shown on the left in FIG. 1, into a dividing position, which is shown on the right in FIG. 1 and in which the compartment divider protrudes into the storage compartment 1 and separates a cylindrical storage region 6 from the storage compartment 1. In the exemplary embodiment, the compartment divider 5, in the dividing position, extends the semi-cylindrical bulge 2 to form a three-quarter cylinder, but herein designs are also possible in which the compartment divider 5 closes the storage region 6 to form a full cylinder. A non-illustrated beverage container, such as, for example, a beverage can, a cup, a mug, or a drinking bottle, can be placed into the storage region 6. When not in use, the rotating plate 4, along with the compartment divider 5, is moved into the home position, in which the bulge 2 is open toward the storage compartment 1 and, therefore, the storage compartment 1, in the full size thereof, can be used for storing objects.

Figure 2:
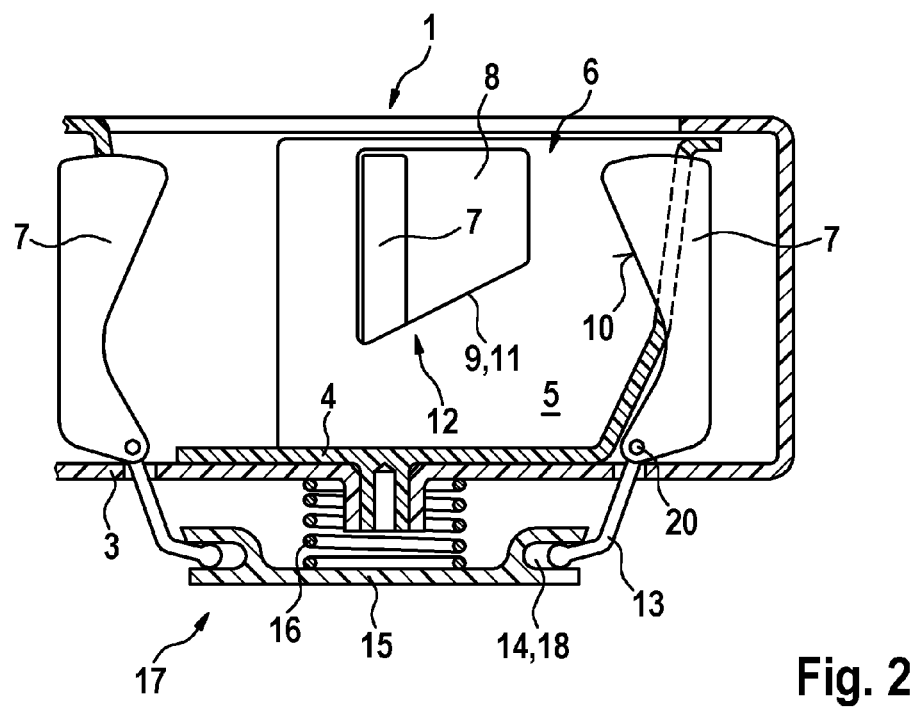
FIG. 2 shows an axial sectional view according to a cutting line II-II in FIG. 1.

On a circumferential region of the bulges 2, the storage compartment 1 comprises three fixed support elements 7, which are disposed so as to be offset relative to one another by approximately 90° in the circumferential direction. The support elements 7 are designed in the manner of retaining jaws and, as shown in FIG. 2, are supported by means of swivel bearings 20 so as to be swivelable about horizontal axes. By means of the swivel bearings 20, the support elements 7 can be moved into and out of the storage region 6 of the storage compartment 1.

For two of the three fixed support elements 7, the compartment divider 5 comprises windows 8, through which the support elements 7 can be moved into the storage region 6, with the compartment divider 5 in the dividing position. The windows 8 extend in the circumferential direction and have a lower edge 9 extending at a slant with respect to the circumferential direction, the edge rising in the direction in which the compartment divider 5 moves during movement from the dividing position into the home position. The support elements 7 have downward and outward oriented slanted surfaces 10, which interact with the slanted lower edges 9 of the windows 8 of the compartment divider 5: If the support elements 7 are moved, in the dividing position of the compartment divider 5, through the windows 8 of the compartment divider and into the storage region 6, as shown on the right in FIG. 1 and in FIG. 2, the slanted surfaces 10 of the support elements rest on the lower edges 9 of the windows 8. If the compartment divider 5 is moved out of the dividing position and into the home position, the slanted lower edges 9 of the windows 8 glide along the slanted surfaces 10 of the support elements 7 and force the support elements 7 outward, out of the storage region 6. In the home position of the compartment divider 5, the support elements 7 are located outside of the windows 8 in the compartment divider 5 and are covered by the compartment divider 5. The third, fixed support element 7 is located outside of the compartment divider 5 in the home position and in the dividing position. The edges 9 of the windows 8 interacting with the slanted surfaces 10 of the support elements 7 and extending at a slant with respect to the direction of motion of the compartment divider 5 can also be referred to as first control curves 11 for a first curve control 12, which forces the support elements 7 out of the storage region 6 when the compartment divider 5 is moved out of the dividing position and into the home position.

The support elements 7 comprise control elements 13, which protrude rigidly downward from the support elements and, after an angling, protrude inward, the free ends of which engage into a circumferential groove 14 of a circular disk-shaped synchronization element 15. The synchronization element 15 is disposed coaxial to the rotating plate 4 and so as to be vertically movable under the base 3 of the storage compartment 1, and is pressed away from the base 3 by a spring element 16. Via the synchronization element 15 and the control elements 13, the spring element 16 forces all support elements 7 inward into the storage region 6 of the storage compartment 1, which is to say, the support elements 7 are moved, under spring force, into the storage region 6.

During the movement of the compartment divider 5 out of the dividing position and into the home position, the first curve controls 12 force two of the support elements 7 outward, out of the storage region 6, against the force of the spring element 15, in the manner described. In this case, the control elements 13 engaging in the groove 14 of the synchronization element 15 lift the synchronization element 15 and move the synchronization element in the direction of the base 3 of the storage compartment 1. Lifting of the synchronization element 15, by way of the control element 13 engaging in the groove 14, also causes the third support element 7, which is located outside of the compartment divider 5, to swivel outward, out of the storage region 6. The synchronization element 15 interacting with the control elements 13 forms a synchronization mechanism 17, which moves the support elements 7 jointly into and out of the storage region 6. The circumferential groove 14 of the synchronization element 15 and the control elements 13 of the support elements 7 can also be referred to as a second curve control, having the circumferential groove 14 as the second control curve 18.

As shown in FIG. 1, a fourth, movable support element 19 is disposed on a free end of the compartment divider 5 and moves along with the compartment divider 5. The movable support element 19 is designed similar to the fixed support elements 7 and is supported on the compartment divider 5 at the bottom via a swivel bearing so as to be swivelable about a horizontal swivel axis. By means of the swivel bearing, the movable support element 19 can be moved into and out of the storage region 6 for a beverage container of the storage compartment 1, as is the case with the fixed support elements 7. As is the case with the fixed support elements 7, the movable support element 19 comprises a control element, which protrudes rigidly downward from the support element and, after an angling, protrudes inward, the free end of the control element engaging in the groove 14 of the synchronization element 15 forming the control curve 18. As a result, the synchronization mechanism 17, along with the synchronization element 15, also moves the movable support element 19 along with the fixed support elements 7 into and out of the storage region 6. The circumferential groove 14, which forms the second control curve 18, extends in a direction of motion of the movable support element 19 disposed on the compartment divider 5 and is vertically movable by means of the synchronization element 15, which is to say, in the direction of the base 3 of the storage compartment 1 and away from the base 3.

Although the device has been shown and described with respect to certain embodiments, it is obvious that equivalents and modifications will occur to others skilled in the art upon the reading and understanding of the specification. The device includes all such equivalents and modifications, and is limited only by the scope of the following claims.

LIST OF REFERENCE CHARACTERS

Storage Compartment Having a Holder for a Beverage Container 1 storage compartment
2 bulge
3 base
4 rotating plate 5 compartment divider
6 storage region
7 fixed support element
8 window
9 lower edge
10 slanted surface
11 first control curve
12 first curve control
13 control element
14 groove
15 synchronization element
16 spring element
17 synchronization mechanism
18 second control curve
19 movable support element
20 swivel bearing

The invention claimed is:

1. A storage compartment having a holder for a beverage container, the storage compartment comprising:
   a movably guided compartment divider defining a storage region within the storage compartment in which the beverage container can be placed, the compartment divider being moveable between a dividing position in which the compartment divider closes the storage region and the beverage container is separated from an area of the storage compartment located outside of the storage region, and a home position in which the compartment divider is open toward the area of the storage compartment outside of the storage region and does not separate the storage region from the storage compartment; and
   two support elements which can be moved into and out of the storage region for a lateral support of the beverage container placed into the storage region,
   wherein a movement of the compartment divider out of the dividing position into the home position forces one of the two support elements out of the storage region, and
   wherein the two support elements have a synchronization mechanism and the support elements jointly move into and out of the storage region, and one of the two support elements is disposed on the compartment divider.

2. The storage compartment according to claim 1, wherein the compartment divider has a window through which one of the two support elements can be moved into the storage region when the compartment divider is in the dividing position, and an edge of the window of the compartment divider forces the support element out of the storage region when the compartment divider is moved out of the dividing position into the home position.

3. The storage compartment according to claim 2, wherein the edge of the window of the compartment divider extends at a slant with respect to a direction of motion of the compartment divider, and the support element has a slanted surface, along which the slanted edge of the window of the compartment divider glides when the compartment divider is moved out of the dividing position and into the home position, and thereby forces the support element out of the storage region for the beverage container of the storage compartment.

4. The storage compartment according to claim 1, wherein the storage compartment has a first curve control for the two support elements, which is moved by the compartment divider and forces the support elements out of the storage region for the beverage container of the storage compartment during a movement of the compartment divider out of the dividing position and into the home position.

5. The storage compartment according to claim 4, wherein the synchronization mechanism of the support elements has a second curve control having a second control curve, which extends in a direction of motion of the support element disposed on the compartment divider during a movement of the compartment divider, and which is vertically movable, and control elements of the support elements are movable along the second control curve for the second curve control, and therefore a movement of a support element into and out of the storage region for the beverage container of the storage compartment vertically moves the second control curve of the second curve control, and the second control curve transmits the movement of the one support element to the other support element.

6. A storage compartment having a holder for a beverage container, the storage compartment comprising a movably guided compartment divider, by means of which a storage region for the beverage container can be separated off in the storage compartment, and comprising two support elements, which can be moved into and out of the storage region for a lateral support of the beverage container placed into the storage region, wherein a movement of the compartment divider out of a dividing position in which the compartment divider separates the storage region from the storage compartment, into a home position in which the compartment divider does not separate the storage region from the storage compartment, forces one of the two support elements out of the storage region, wherein the two support elements have a synchronization mechanism, and therefore the support elements jointly move into and out of the storage region, and one of the two support elements is disposed on the compartment divider,
   wherein the storage compartment has a first curve control for a support element, which is moved by the compartment divider and forces the support element out of the storage region for the beverage container of the storage compartment during a movement of the compartment divider out of the dividing position and into the home position, and
   wherein the synchronization mechanism of the support elements has a second curve control having a second control curve, which extends in a direction of motion of the support element disposed on the compartment divider during a movement of the compartment divider, and which is vertically movable, and control elements of the support elements are movable along the second control curve for the second curve control, and therefore a movement of a support element into and out of the storage region for the beverage container of the storage compartment vertically moves the second control curve of the second curve control, and the second control curve transmits the movement of the one support element to the other support element.

* * * * *